Nov. 19, 1940.  D. R. BAITY  2,222,326
AUTOMATIC BRAKE
Filed Sept. 19, 1939  2 Sheets-Sheet 1
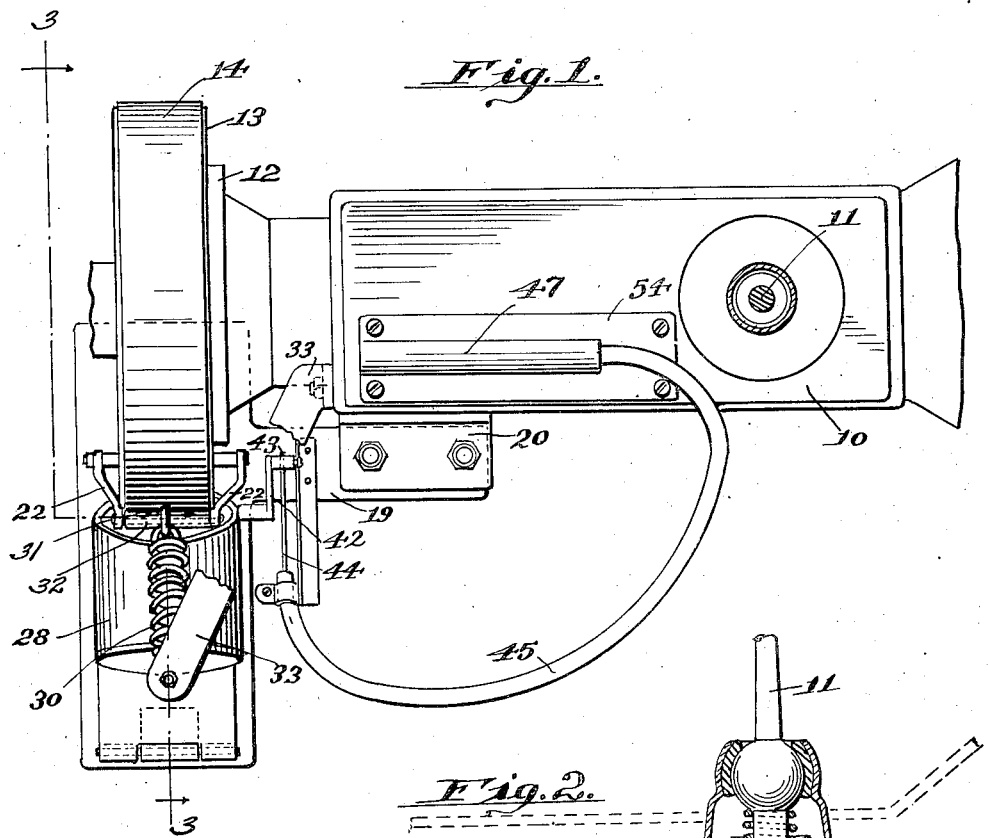
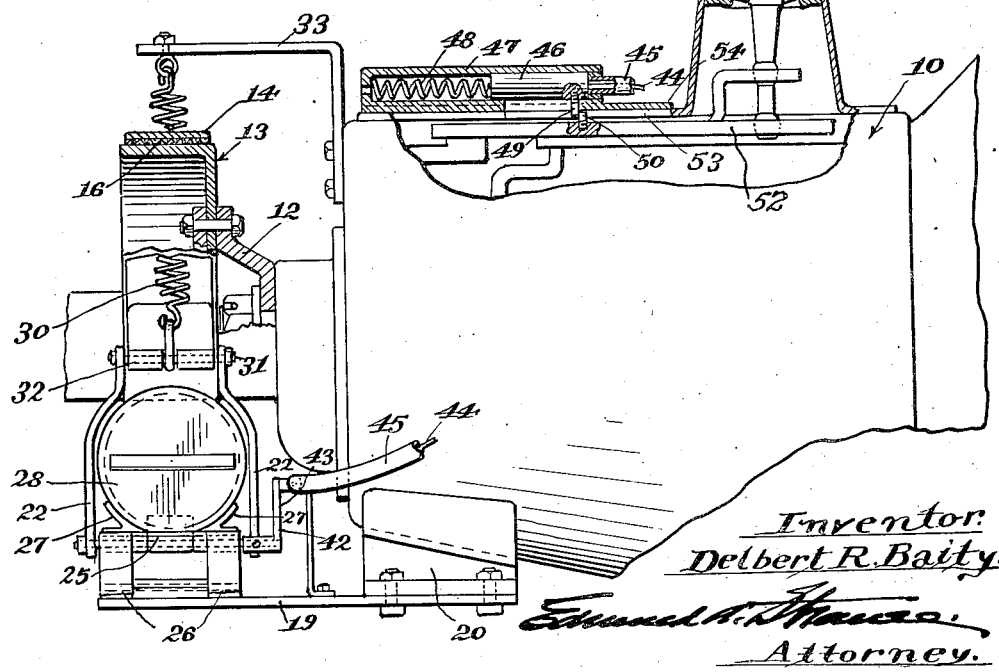
Inventor:
Delbert R. Baity
Attorney.

Nov. 19, 1940.  D. R. BAITY  2,222,326
AUTOMATIC BRAKE
Filed Sept. 19, 1939  2 Sheets-Sheet 2
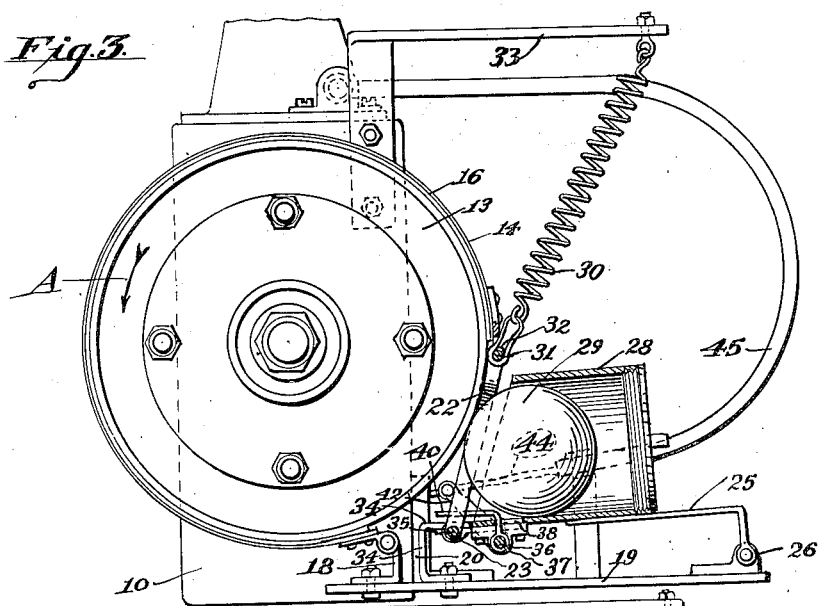
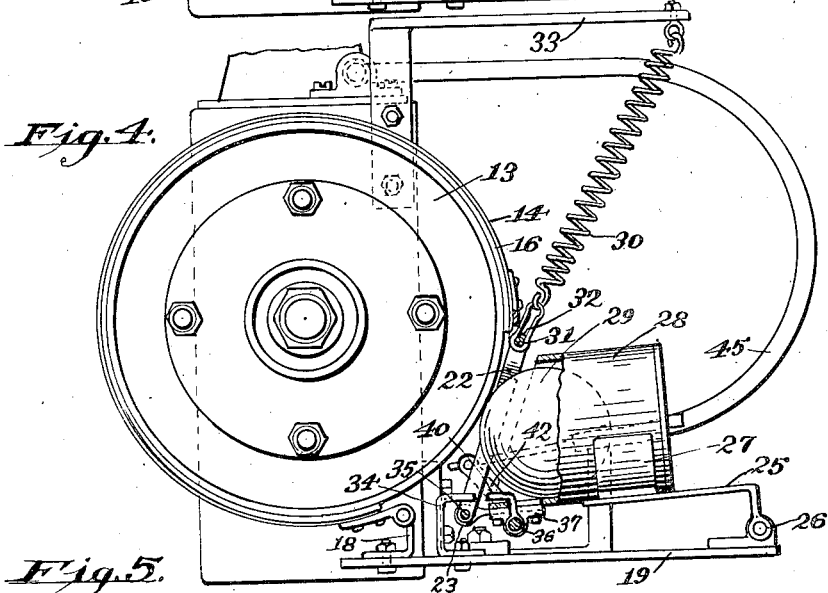
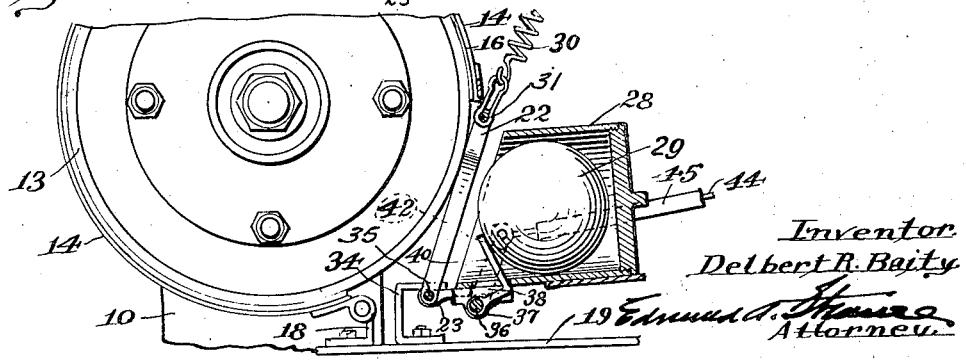
Inventor
Delbert R. Baity
Attorney Patented Nov. 19, 1940

2,222,326

UNITED STATES PATENT OFFICE 2,222,326

AUTOMATIC BRAKE

Delbert R. Baity, Lancaster, Calif.

Application September 19, 1939, Serial No. 295,602

4 Claims. (Cl. 192—4)

This invention relates to motor vehicle brakes, more specifically to a brake which will automatically prevent rearward movement of the vehicle should the same be stopped while ascending a grade or incline.

Apparatus has heretofore been devised to accomplish this result, however it is necessary to release the clutch and apply the brake before it will function.

It is therefore the principal object of this invention to provide an apparatus of the character described which will automatically brake the rearward movement of the vehicle to which it has been applied when stopping on an incline.

Another object is to provide a braking system for stopping rearward movement of a motor vehicle when ascending a grade which will enable the operator to actuate the accelerator and engage the clutch when starting again without having to release the usual brakes.

A further object is to provide a braking device which will be rendered inoperative when the gear shift lever is placed in reverse thereby enabling the vehicle to back up or run rearwardly when it becomes necessary.

A still further object is to provide a braking device of the character stated which may be incorporated with the usual emergency brake connected to the drive shaft flange.

Other objects and advantages will be apparent from the following disclosure reference being had to accompanying drawings in which, Fig. 1 is a top plan view of the brake of the present invention applied to the running gear of a motor car.

Fig. 2 is an end elevation of an internal combustion showing the automatic brake of the present invention applied thereto, parts being shown in section.

Fig. 3 is a section taken on line 3—3 of Fig. 1.

Fig. 4 is a view similar to Fig. 3 showing the brake applied.

Fig. 5 is a fragmentary section showing certain parts of the apparatus as they appear when the gear shift lever is placed in reverse.

Referring to the drawings more specifically to Figs. 1 and 2 the numeral 10 designates the gear box or housing of the transmission of a motor vehicle, 11 the gear shift lever and 12 the main shaft flange.

In present instance the brake drum 13 of the apparatus is shown secured to the main shaft flange of the transmission.

In some makes of cars the emergency brake is secured to this flange while in others it is connected to the first universal joint shaft.

When installing the braking apparatus on cars provided with the emergency brake in the position referred to the brake drum 12 is adapted to be secured to it by welding or the like.

Encircling the drum is a band 14 provided with lining 16, one end of said band being anchored through a bracket 18 to a plate 19 which in turn is secured to the gear case 10 as indicated at 20. It will be understood that the supporting plate may be connected to the side members of the chassis frame or other rigid member if desired. The opposite end of the brake band is connected through links 22 to brackets 23 that are secured to a plate 25 which is pivotally connected at 26 to the plate 19.

Secured to arm plate 25 by straps or bands 27 is a hollow or tubular guide member 28 in which is movably mounted a ball 29 formed of rubber or other resilient material that normally engages the rim or outer face of the brake drum 13 as clearly shown in Figs. 3 and 4.

The axis of the tubular member lies in an inclined plane so that the ball will touch or engage the face of the brake drum by gravity and is normally retained in this position by a retractile coil spring 30 one end of which is connected to a pin 31 engaging the links 22 and an ear 32 secured to the brake band, while the opposite end is connected to an arm 33 secured to the gear case or other suitable rigid member of the vehicle.

Upward movement of member 28 through tension of spring 30 being limited by a stop member 34 secured to plate 19 and engaging the pin 35 connecting the lower ends of the links 22 with the brackets 23.

It will be understood that spring 30 also serves to hold the band 14 released from the drum until the apparatus functions during rearward movement of the vehicle.

Secured to a rock shaft 36 journalled in bearings 37 secured to the under side of member and extending through a slot 38 formed in member 28 is a lever 40 that serves to hold the ball out of engagement with the brake drum (see Fig. 5) when the vehicle is moving rearwardly under its own power.

Lever 40 is operated when the gear shift lever 11 is placed in reverse and is interconnected therewith as follows:

Secured to the inner end of the rock shaft 36 is an arm 42 to which is connected as indicated at 43 a flexible cable or steel wire 44 slidable in a tube 45, the opposite end of said wire being secured to a plunger 46 slidable in a cylinder 47.

The plunger is urged outwardly by an expansion spring 48 and is operable by a pin 49 thereon contacting with a pin 50 projecting from the gear shift rail 52 (first and reverse) when said plate is moved rearwardly.

It will be understood that when the apparatus is installed on a vehicle in use a slot 53 should be cut in cover plate 54 of the gear case in order to accommodate movement of pins 49 and 50 as shown in Fig. 2. Cylinder 47 having a flat bottom and an extension 54 formed thereon in order to cover the slot 53 and prevent dust entering the gear case.

While it is desirable to operate lever 40 in the manner above described it will be understood it may be operated by pulling on and holding the wire 44 when it is desired to drive the vehicle rearwardly, the wire and tube 45 in this case being extended to a position within easy reach of the driver.

From the foregoing it will be seen that during forward movement of the vehicle the ball 29 will merely roll in the tubular member or intermittently engage the face of the brake drum 13, the brake drum then rotating in the direction indicated by the arrow A of Fig. 3.

Should the vehicle be stopped or stalled while ascending an incline or grade and starts moving rearwardly the ball 29 will be immediately engaged by the brake drum causing the tubular member to be rocked downwardly on the axis of the pivotal connection 26 with plate 19. This downward movement through links 22 tightens the band on the brake drum as shown in Fig. 4 resulting in stopping rearward movement of the vehicle.

It will also be noted that downward movement or rocking of the tubular member 28 prevents the ball 29 from becoming jammed or wedged therein when the brake is being applied.

When it is desired to back up it is only necessary to place the gear shift lever in reverse, start the engine and let in the clutch in the usual manner, the ball 29 being then held out of contact with the brake drum as previously described.

What I claim is:

1. An automatic brake for motor vehicles comprising a brake drum, a brake band surrounding said brake drum, a guide member pivotally mounted adjacent said brake drum, means connecting said guide member with said brake band, retractile spring means urging said guide member upwardly, stop means limiting upward movement of said guide member, and a movable element mounted in said guide member contacting with said brake drum, whereby said brake band will be tightened on said brake drum and prevent rearward movement of the vehicle when the same is on an incline.

2. An automatic brake for motor vehicles comprising a brake drum, a band encircling said brake drum, a plate secured to a rigid member of the vehicle, means connecting one end of said brake band to said plate, a tubular guide member pivotally mounted on said plate, a ball movably mounted in said tubular guide member and contacting with the rim of said brake drum, links connecting the opposite end of said brake band with said tubular guide member, a retractile spring connected to and urging said tubular guide member upwardly, and a stop member secured to said plate for limiting upward movement of said tubular guide member.

3. In a motor vehicle in combination with its drive shaft and transmission, a brake drum connected to the drive shaft, a band encircling said brake drum, a plate secured to a rigid member of the vehicle, a tubular guide member pivotally mounted on said plate, a ball movably mounted in said tubular guide member and contacting the rim of said brake drum, whereby said brake band will be tightened on said brake drum and prevent rearward movement of the vehicle when the same is on an incline, means connecting said brake band with said tubular guide member, a lever pivotally connected to said tubular guide member for holding said ball out of engagement with said brake drum, and means interconnecting said lever with the forward and reverse gear shift rail of the transmission, whereby when said rail is actuated to place the vehicle in reverse, said ball in the tubular guide member will be held out of contact with the brake drum thereby permitting rearward movement of the vehicle.

4. An automatic brake for motor vehicles comprising a brake drum, a brake band surrounding said brake drum, a tubular guide member pivotally mounted adjacent said brake drum, means connecting said guide member with said brake band, spring means urging said guide member upwardly, a movable element in said tubular guide member contacting with the face of said brake drum, and means for holding said movable member out of contact with said brake drum when it is desired to reverse movement of the vehicle.

DELBERT R. BAITY.